Oct. 21, 1952 J. P. PAVLAK 2,614,434
HOSE REELING APPARATUS
Filed Feb. 28, 1947
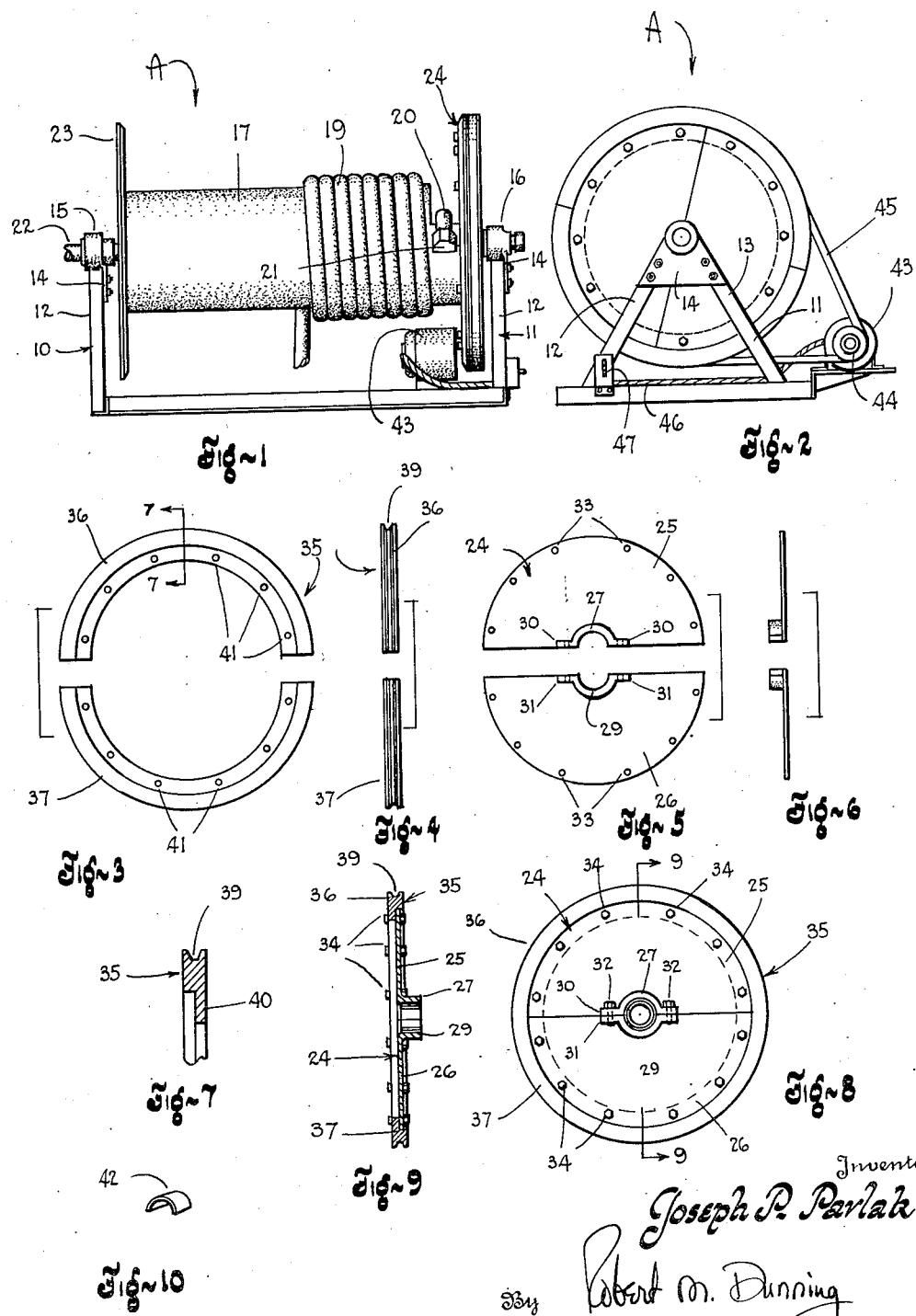
Inventor
Joseph P. Pavlak
By Robert M. Dunning
Attorney Patented Oct. 21, 1952

2,614,434

UNITED STATES PATENT OFFICE 2,614,434

HOSE REELING APPARATUS

Joseph P. Pavlak, South St. Paul, Minn.

Application February 28, 1947, Serial No. 731,532

5 Claims. (Cl. 74—230.11)

My invention relates to an improvement in hose reeling apparatus wherein it is desired to provide a simple and effective means of winding a hose upon a reel.

Trucks designed for the transportation of liquid materials such as gasoline, fuel oil, and the like, are often provided with hoses through which the liquid contents of the truck is dispensed. These hoses are often of considerable length, particularly when designed for the sale of fuel oil. Certain trucks of the type described are provided with reels which are driven from a suitable source of power supply. Many other trucks, however, are merely provided with a rotatable reel on which the hose is wound by the use of a crank or similar tool. As considerable effort is required to manually wind the hose upon the reel, it is extremely desirable that a means be provided whereby such reels may be power driven.

An object of the present invention lies in the provision of a simple apparatus which may be added to a manually operable hose reel so that the reel may be power driven. This apparatus is so designed that it may be readily added to hose reels of various designs with a minimum of effort.

A feature of the present invention resides in the provision of a hose reel including a split pulley which may be added to one end of the hose reel without demounting the entire apparatus. As a result the reel may be reconstructed for power operation with little effort.

An added feature of my invention resides in the provision of a hose wheel power drive mechanism which will not interfere with manual operation of the reel when desired. The reel may if desired be manually rotated by its crank to wind up the hose thereupon.

A feature of the present invention resides in the provision of a starter motor having a pulley thereon and in connecting this pulley to a pulley mounted on the hose reel with a suitable belt. A starting switch is provided for closing the circuit to the starting motor and the motor is connected to either the truck battery or to an auxiliary battery provided for the purpose. By actuating the starter switch the reel may be driven in a direction to wind the hose upon the reel. During this operation the operator may guide the hose so as to insure its proper winding upon the reel.

An added feature of the present invention lies in the provision of a split disc which may be attached to the shaft of the hose reel and which may support the split pulley. Thus if the end of the hose reel is not suitably shaped to permit easy attachment of the split pulley thereto the disc may be mounted on the reel shaft to provide a means of supporting the pulley.

These and other objects and novel features of my invention will be more clearly and fully set forth in the following specification and claims.

In the drawings forming a part of my specification:

Figure 1 is a front elevational view of a hose reel showing the pulley and drive motor attached thereto.

Figure 2 is an end elevational view of the reel illustrated in Figure 1 showing the belt connecting the reel pulley to the driving motor.

Figure 3 is an elevational view of the pulley showing the two halves thereof in spaced relation.

Figure 4 is a view of the pulley as it would appear at right angles to the position illustrated in Figure 3.

Figure 5 is an elevational view of the disc which may be used for supporting the split pulley.

Figure 6 is a side elevation of the disc illustrated in Figure 5.

Figure 7 is a sectional view through the pulley, the position of the section being indicated by the line 7—7 of Figure 3.

Figure 8 is an elevational view of the assembled disc and pulley.

Figure 9 is a sectional view through the assembled disc and pulley, the position of the section being indicated by the line 9—9 of Figure 8.

Figure 10 is a perspective view of a bushing section of a type which may be used within the hub of the disc to clamp the disc to the reel shaft.

The hose reeling apparatus A includes a pair of standards 10 and 11 each including a pair of angle or channel members 12 and 13 spaced at their lower ends and converging toward one another at their upper ends. The upper ends of the braces 12 and 13 are connected by gusset plates 14. The gusset plates and braces support aligned bearings 15 and 16 which rotatably support the hose reel.

The reel includes a substantially cylindrical reel core 17 about which the hose 19 may be wound. One end 20 of the hose 19 is connected to the hollow interior of the supporting shaft. The supporting shaft is hollow and extends axially through the reel core 17 and continues as indicated at 22 through one of the bearings 15.

The reel core 17 is provided with a disc 23 at one end thereof and also may be supported with a similar disc at the opposite end. In such an event the split pulley may be secured directly to this disc. However, in the form of construction illustrated I provide an additional split disc which may be mounted upon the shaft 22 to rotate therewith and which may act as a support for the pulley. This disc 24 is best illustrated in Figures 5 and 6 of the drawings.

The disc 24 is formed of two semi-circular parts 25 and 26 having integral hub sections 27 and 29 thereupon. These hub sections are provided with opposed outwardly extending ears 30 and 31, respectively, which may be secured together by bolts 32 or cap screws. Thus the hub portions 27 and 29 may be clamped about the shafts 22, thus holding the disc 24 in proper position upon the shaft.

The disc 24 is provided with a series of angularly spaced apertures 33 about the periphery thereof. These bolts are designed to accommodate clamping bolts 34 which hold the disc 24 to the split pulley 35 best illustrated in Figures 3 and 4 of the drawings. Thus the disc 24 and the pulley 35 form a demountable pulley on the shaft of the winding drum to provide a means of supplying power to the drum.

The pulley 35 is made in two semi-circular sections 36 and 37, each of these sections being provided with a peripheral groove 39 which is designed to accommodate a V-belt or the like. The pulley sections 36 and 37 are formed as best illustrated in Figure 7 with an inwardly extending flange 40 thereupon designed to overlap the marginal edge of the supporting disc 24. The flange 40 is provided with angularly spaced apertures 41 which are designed to register with the apertures 33 of the disc 24 so that the bolts 34 may be inserted therethrough.

It will be noted that the pulley sections 36 and 37 are arranged with their abutting ends at right angles to the abutting edge between the disc sections 25 and 26 so that the disc sections may help to hold the pulley sections assembled and the pulley sections may assist in holding the two parts of the disc from separation. The holes either in the disc or in the pulley sections may be slightly oversized to accommodate any slight separation between the disc sections when the same are clamped about the drum shaft.

The hub halves 27 and 29 are of a size to accommodate the largest supporting shaft originally used in manually operating winding reels with which the applicant is familiar. Bushings or shims 42 are provided of an external diameter to fit within the hub sections 27 and 29 and having an internal diameter to fit about a shaft of smaller dimensions. Thus my pulley is equipped to fit any size supporting shaft of any manually operated reel in common usage.

In order to drive the reel drum I provide a starter motor 43 somewhat similar to the type of motor employed for starting the engine of the truck. This starter motor is completely enclosed so as to eliminate any chance that sparking of the brushes will create an explosion if the liquid being carried is of explosive material. The motor 43 is equipped with a pulley 44 in line with the sectional pulley 35 and is connected thereto by means of a belt 45.

A cable 46 connects the motor 43 to the truck battery or to any other suitable source of current supply. In practice, however, I have found that either the usual truck battery or an auxiliary truck battery may be used as the power supply source. A switch 47 similar to a vehicle starting switch is interposed in the cable 46 between the motor and the battery so as to control the flow of current to the the motor 43.

The operation of my hose reel is believed obvious from the foregoing description. When liquid in the truck is to be dispensed, the operator carries the dispensing end of the hose 19 to the desired spot and inserts the hose in the liquid receiving receptacle. The liquid is then pumped through the hose 19 into the receptacle. At the termination of the dispensing operation the operator returns to the truck and operates the motor controlling switch 47 with one hand while guiding the hose onto the reel with the other hand. As a result the hose may be evenly wound upon the reel with little difficulty and in a minimum of time. In view of the reduction in effort expended, the truck operator is often able to complete a greater number of deliveries each day without excessive effort.

In accordance with the patent statutes, I have described the principles of construction and operation of my hose reeling apparatus, and while I have endeavored to set forth the best embodiment thereof, I desire to have it understood that obvious changes may be made within the scope of the following claims without departing from the spirit of my invention.

I claim:

1. A pulley comprising a pair of semi-circular sections, means for connecting said sections together to form a circular structure with the ends abutting, a pair of semi-circular rings having a groove in the outer surface thereof, and means for connecting said rings to said sections with the ends of the rings abutting to form a circular ring structure, the abutting ends of the ring being angularly off-set from the abutting ends of the sections.

2. The structure described in claim 1 and in which the abutting ends of the rings are on a plane at right angles to the plane of the abutting ends of the sections.

3. The structure described in claim 1 and including a hub portion on each of said sections.

4. The structure described in claim 1 and including a substantially semi-circular hub member on each of said sections, said hub members forming a cylindrical hub when said sections are connected together.

5. The structure described in claim 1 and including a substantially semi-cylindrical hub member secured to each of said sections, said hub members combining to form a generally cylindrical hub when said sections are attached together, outwardly extending flanges on each hub member, said means for attaching said sections together extending through said flanges.

JOSEPH P. PAVLAK.

REFERENCES CITED

The following references are of record in the file of this patent:

UNITED STATES PATENTS

| Number | Name | Date |
|---|---|---|
| 405,352 | Gilbert | June 18, 1889 |
| 413,733 | Richards | Oct. 29, 1889 |
| 1,157,710 | Marqua | Oct. 26, 1915 |
| 1,197,096 | Bailey et al. | Sept. 5, 1916 |
| 1,506,517 | Dowrelio | Aug. 26, 1924 |
| 1,626,322 | Bell | Apr. 26, 1927 |
| 1,733,598 | Hubbard | Oct. 29, 1929 |
| 1,816,503 | Uff | July 28, 1931 |
| 2,301,208 | Gear | Nov. 10, 1942 |

FOREIGN PATENTS

| Number | Country | Date |
|---|---|---|
| 356,646 | Great Britain | Sept. 10, 1931 |